E. E. PHINNEY.
CARRYING MECHANISM FOR CALCULATING MACHINES.
APPLICATION FILED DEC. 4, 1914.
1,197,538.
Patented Sept. 5, 1916.
Fig. 1.
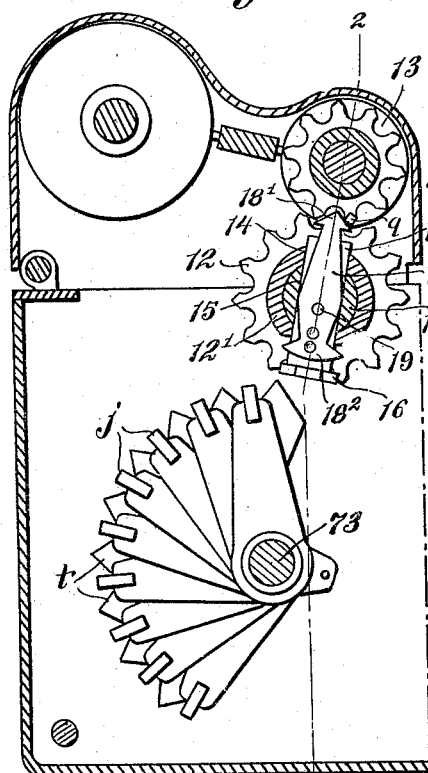
Fig. 2.
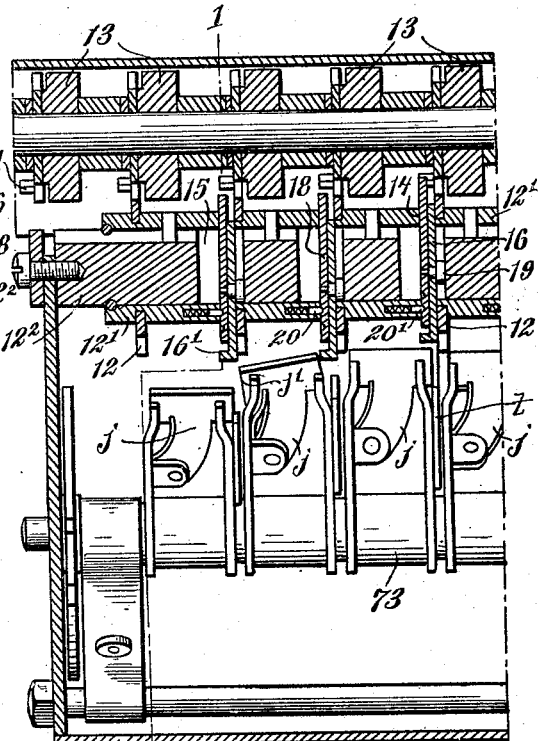
Fig. 3. Fig. 4.
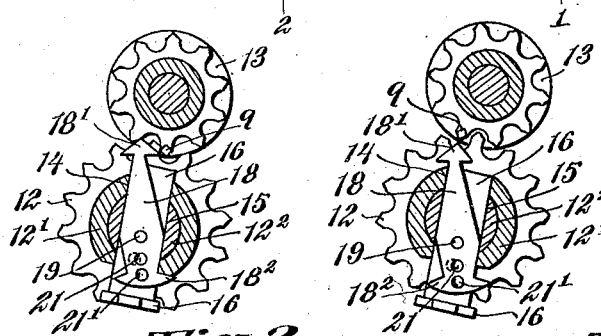
Fig. 5.
Fig. 6.
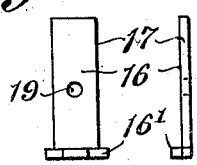
Inventor:
Edgar E. Phinney
E. W. Anderson ic
UNITED STATES PATENT OFFICE.

EDGAR E. PHINNEY, OF NEW YORK, N. Y., ASSIGNOR TO MONROE CALCULATING MACHINE COMPANY, OF NEW YORK, N. Y., A CORPORATION OF NEW YORK.

CARRYING MECHANISM FOR CALCULATING-MACHINES.

1,197,538.        Specification of Letters Patent.        Patented Sept. 5, 1916.

Application filed December 4, 1914. Serial No. 875,493.

*To all whom it may concern:*

Be it known that I, EDGAR E. PHINNEY, a citizen of the United States, resident of New York, in the county of New York and State of New York, have made a certain new and useful Invention in Carrying Mechanism for Calculating-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a vertical sectional view on the line 1—1, Fig. 2, showing the invention as applied, the pivoted member being in normal position. Fig. 2 is a section on the line 2—2, Fig. 1. Fig. 3 is a detail side view of the two part plunger and the engaged wheels, showing the pivoted member as moved pivotally to one side. Fig. 4 is a similar view showing the two part plunger as depressed. Fig. 5 shows detail side and edge views of the pivoted member. Fig. 6 shows similar views of the other or carrying member of the two part plunger.

The invention has relation to carrying mechanism for calculating machines, embodying certain improvements upon the machine of the Patent No. 1,080,245, dated December 2, 1913, with the object of providing for easier working and more positive action.

Other objects and advantages will hereinafter appear.

The invention consists in the novel construction and combinations of parts, as hereinafter set forth.

In the accompanying drawings, illustrating the invention, the numeral 13 designates the numeral wheels of the registering mechanism, 12 the intermediate gears, carried by collars 12′ fitting upon shaft $12^2$; 73 the shaft of the carrying mechanism, and $j$ the pivoted dogs of the carrying mechanism.

In order to allow for slight extra movement in either direction of rotation of the wheels 13, under momentum thereof, without actuation of the carrying devices, when the machine is being operated at high speed and is suddenly stopped at certain points, as 0 and 9, through the medium of a reciprocatory plunger device, the plungers of the patent are modified preferably as follows: In place of each of the plungers of the patent, a two-part plunger is employed, working in slots 14 of the collars 12′ and perforations 15 of the shaft, and consisting of a member 16 having parallel edges 17 and a laterally-turned beveled foot 16′, and a second member 18, pivoted at 19 to the other member, capable of a limited swing to either side, as hereinafter stated, and having a beveled top 18′.

Means are provided to releasably hold the plungers in raised and in lowered position, being preferably a spring latch 20, seated in each collar 12′ and engaging with either one of lateral recesses 21, 21′ of the member 16 of the plunger.

In the carrying operation, the shaft 4 of the primary wheels is rotated once completely, the carrying shaft 73 rotating also once completely, and as the lateral tooth extension $q$ of any one of the gears 13 is caused to engage with the beveled top of the member 18, said member will be swung upon its pivot until it contacts with the side wall of its seat in the collar and shaft, when both members of the plunger will be forced down to the lower limit of their movement, or until the spring latch engages with the upper recess 21, the beveled foot of the member 16 being at the same time depressed in position to, in the rotation of the shaft 73, engage and throw the dog $j$ immediately below the plunger, so that the opposite end $j'$ of the dog will project in position to engage and turn the next intermediate gear 12 and also the next numeral wheel 13 one tooth only, when the plunger will be raised to normal position by the cam $t$ upon the radial dog-carrying arm, acting upon the bottom of the foot of the plunger.

The top and foot of the plunger members are oppositely beveled, so that the plunger will be depressed and the carrying dog properly thrown in either direction of rotation.

As the plunger is raised, the pivotal member 18 is centered with relation to its seat, preferably by cam engagement of the rounded end 20′ of the spring latch 20 with the rounded seat 21.

Owing to the pivotal movement of the plunger member before the plunger is depressed, the plunger top assumes a lower or easier working bevel than in the case of the plunger of the patent. In this case also the plunger is usually made with two punchings, instead of one drop forging, and the shaft is perforated with round instead of angular or square holes.

The pivoted member of the plunger is usually provided with a laterally extended lower end 18', having contact with the collar 12' to limit the upward movement of the plunger.

What I claim is:

1. In a calculating machine, a carriage, a series of numeral wheels thereupon, a series of gear wheels engaging said numeral wheels, carrying mechanism including a rotary shaft having carrying members, and depressible carrying devices operated by said numeral wheels and having engagement with said members, said carrying devices being laterally yieldable to allow extra movement of the numeral wheels when suddenly checked, without depression of said devices.

2. In a calculating machine, a carriage, a series of numeral wheels thereupon, a series of gear wheels engaging said numeral wheels, carrying mechanism including a rotary shaft having carrying members, and depressible carrying devices operated by said numeral wheels and engaging said members, said devices having pivoted members to allow extra movement of the numeral wheels when suddenly checked, without depression of said devices.

3. In a calculating machine, a carriage, a series of numeral wheels thereupon, a series of gear wheels engaging said numeral wheels, carrying mechanism including a rotary shaft having carrying members, and reciprocatory plungers operated by said numeral wheels and engaging said members, said plungers being seated in the shaft of said gear wheels and laterally yieldable to allow extra movement of the numeral wheels when suddenly checked, without depression of the plungers.

4. In a calculating machine, a carriage, a series of numeral wheels thereupon, a series of gear wheels engaging said numeral wheels, carrying mechanism including a rotary shaft having carrying members, and reciprocatory plungers operated by said numeral wheels and engaging said members, said plungers being seated in the shaft of said gear wheels and having pivoted members to allow extra movement of the numeral wheels when suddenly checked, without depression of the plungers.

5. In a calculating machine, a carriage, a series of numeral wheels thereupon, a series of gear wheels engaging said numeral wheels, carrying mechanism including a rotary shaft having carrying members, and reciprocatory plungers operated by said numeral wheels and engaging said members, said plungers being seated in the shaft of said gear wheels and including pivoted members normally centered in their seats in said shaft and having pivotal movement to either side into contact with the walls of said seats, before depression of the plungers.

6. In a calculating machine, a carriage, a series of numeral wheels thereupon, a series of gear wheels engaging said numeral wheels, carrying mechanism including a rotary shaft having carrying members, and reciprocatory plungers operated by said numeral wheels and engaging said members, said plungers being seated in the shaft of said gear wheels and including each a member having a beveled foot, and a pivoted member having a beveled top, normally centered in its seat in said shaft and having movement into contact with the wall of its seat before depression.

7. In a calculating machine, a carriage, a series of numeral wheels thereupon, a series of gear wheels engaging said numeral wheels, carrying mechanism including a rotary shaft having carrying members, and reciprocatory plungers operated by said numeral wheels and engaging said members, said plungers being seated in the shaft of said gear wheels and including each a member having a laterally-turned beveled foot, and a pivoted member having a beveled top, normally centered in its seat and having movement into contact with the wall of its seat before depression, and means for holding the plungers in raised and in lowered position, and for restoring the pivoted member to normal centered position in its seat.

In testimony whereof I affix my signature, in presence of two witnesses.

EDGAR E. PHINNEY.

Witnesses:
CHAS. M. CLOSE,
C. S. WILLIAMS.

Copies of this patent may be obtained for five cents each, by addressing the "Commissioner of Patents, Washington, D. C."